US008709226B2

(12) United States Patent
Wei et al.

(10) Patent No.: US 8,709,226 B2
(45) Date of Patent: Apr. 29, 2014

(54) INSTANTANEOUS ELECTRODEPOSITION OF METAL NANOSTRUCTURES ON CARBON NANOTUBES

(75) Inventors: Xin Wei, Pearland, TX (US); Yuanjian Deng, Houston, TX (US); Renard L. Thomas, Angleton, TX (US); Bobby Wilson, Houston, TX (US)

(73) Assignee: Texas Southern University, Houston, TX (US)

( * ) Notice: Subject to any disclaimer, the term of this patent is extended or adjusted under 35 U.S.C. 154(b) by 650 days.

(21) Appl. No.: 12/518,382

(22) PCT Filed: Dec. 26, 2007

(86) PCT No.: PCT/US2007/088843
§ 371 (c)(1),
(2), (4) Date: Feb. 8, 2010

(87) PCT Pub. No.: WO2008/140623
PCT Pub. Date: Nov. 20, 2008

(65) Prior Publication Data
US 2010/0140097 A1     Jun. 10, 2010

Related U.S. Application Data

(60) Provisional application No. 60/877,125, filed on Dec. 26, 2006.

(51) Int. Cl.
*C23C 28/00*     (2006.01)

(52) U.S. Cl.
USPC .......................................... 205/183; 977/742

(58) Field of Classification Search
USPC ....................................................... 205/264
See application file for complete search history.

(56) References Cited

U.S. PATENT DOCUMENTS 6,975,063 B2 * 12/2005 Mao et al. ...................... 313/309
7,105,596 B2    9/2006 Smalley et al.
(Continued)

FOREIGN PATENT DOCUMENTS

WO    WO 2006/099593 A2    6/2006

OTHER PUBLICATIONS

He et al., Electrodeposition of Pt-Ru Nanoparticles on Carbon Nanotubes and their Electrocatalytic Properties for Methanol Electrooxidation, Diamond and Related Materials, 2004, vol. 13, No. 10, 1764-1770.*

(Continued)

*Primary Examiner* — James Lin
*Assistant Examiner* — Brian W Cohen
(74) *Attorney, Agent, or Firm* — Winstead PC

(57) ABSTRACT

A method comprising: dispersing carbon nanotubes in a solvent; and depositing the carbon nanotubes on a porous, conductive substrate; wherein the porous, conductive substrate is capable of functioning as a filter and a working electrode. The method of claim 1 further comprising: engaging the porous, conductive substrate with deposited carbon nanotubes in an electrochemical cell; and depositing at least one metallic structure on the surface of the carbon nanotubes from an electrolyte solution to form metallized carbon nanotubes. A composite comprising: metallized carbon nanotubes generated by the method of claim 2; wherein the at least one metallic structure comprises a conductive metal atom selected from the group consisting of platinum, gold nickel, copper, iron, chromium, zinc, and combinations thereof; and a matrix material selected from the group consisting of epoxies, thermosets, thermoplastics, elastomers, metals, metal matrix composites, ceramics and combinations thereof.

14 Claims, 18 Drawing Sheets

(56) References Cited

U.S. PATENT DOCUMENTS

| | | |
|---|---|---|
| 8,419,913 B2* | 4/2013 | Sato et al. ............... 204/403.04 |
| 2004/0197546 A1 | 10/2004 | Rinzler et al. |
| 2005/0145503 A1* | 7/2005 | Kozlov et al. ................ 205/255 |
| 2005/0157445 A1* | 7/2005 | Bradley et al. ............... 361/226 |
| 2005/0220988 A1 | 10/2005 | Dodelet et al. |
| 2005/0263456 A1* | 12/2005 | Cooper et al. ............... 210/660 |
| 2006/0043861 A1 | 3/2006 | Liu et al. |
| 2006/0135030 A1 | 6/2006 | Mao et al. |
| 2006/0234039 A1* | 10/2006 | Bose et al. .................... 428/341 |
| 2010/0173478 A1* | 7/2010 | Tombler ....................... 438/478 |

OTHER PUBLICATIONS

International Search Report and Written Opinion for PCT/US2007/088843 mailed Oct. 10, 2008.

European Search Report for European Patent Application No. 07874391.1, dated Jun. 21, 2013.

Wu et al., Transparent, Conductive Carbon Nanotube Films, Science, 2004, vol. 35, No. 5688, 1273-1276.

Arai et al., Ni-deposited multi-walled carbon nanotubes by electrodeposition, Carbon, 2004, vol. 42, No. 3, 641-644.

* cited by examiner

INSTANTANEOUS ELECTRODEPOSITION OF METAL NANOSTRUCTURES ON CARBON NANOTUBES

BACKGROUND

Metallization of carbon nanotubes (CNTs) presents a next-generation nanotechnology for many important applications, such as fuel cells, electrochemical sensors, CNT alignment and patterning, assessment of CNTs' structural defects, electromagnetic interference shielding, and the like. Metallized CNTs (mCNTs) also offer unique solutions to problems encountered in nano-reinforced composites. Further explorations in these areas demand advances in the development of mass-production techniques for the production of mCNTs.

Although the metallization of nanotubes has been accomplished by previous methods, each method has limitations affecting its commercial feasibility. For example, physisorption and electroless plating have both been previously used to deposit metal nanoparticles on CNTs, but both methods utilize an oxidative acid pretreatment step to create additional sidewall defects in the CNTs prior to metal nanoparticle attachment. The additional CNT sidewall defects act as either attachment sites (physisorption) or nucleation sites (electroless plating) to achieve metallization. However, sidewall defects are known to degrade the mechanical and electrical properties of CNTs and the oxidative acid treatment to create the defects is, thus far, a time-consuming and uncontrolled process. In addition, the physisorption technique requires a separate preparation of metal nanoparticles prior to a lengthy sonication process in order to disperse and attach the metal particles onto CNTs.

The electroless plating method often requires a complicated activation-sensitization procedure to prepare the CNT surface for metal depositions. The harsh acid treatment, the extended sonication, the activation-sensitization procedure, and certain galvanic displacement reactions are very disruptive to the intrinsic structure and properties of CNTs. In addition, physisorption and electroless plating processes often result in chunky metal particles (≥50 nm in diameter) mounted on the CNT surface, where severe dislodging is often observed due to the large size of the metal particles and the relatively loose attachment.

It remains exceptionally challenging to achieve reliable electrical contact with bulk CNT samples, an important step for accomplishing electrochemical deposition. Previous efforts to solve this problem include growing CNTs on conducting substrates, microlithography, electrophoresis, sputtering, or thermal evaporation. These processes have been largely unsuccessful, especially at producing reliable, large-scale (grams) amounts of metallized CNTs. Therefore, there remains a need for a scalable process which also provides good control of depositing varying morphologies of metal nanostructures on CNTs, from discrete atom clusters to continuous coatings.

SUMMARY

In some aspects, embodiments disclosed herein relate to a method that includes: dispersing carbon nanotubes in a solvent and depositing the carbon nanotubes on a porous, conductive substrate. The porous, conductive substrate is capable of functioning both as a filter and a working electrode in an electrochemical cell. In some embodiments, the substrate-bound carbon nanotubes also provide a convenient storage method until such time as they are ready for use in a metallization process.

In some embodiments, further steps in the metallization of carbon nanotubes include engaging the porous, conductive substrate with deposited carbon nanotubes in an electrochemical cell and depositing at least one metallic structure on the surface of the carbon nanotubes from an electrolyte solution to form metallized carbon nanotubes. In some embodiments, the morphology of the metal deposited on the carbon nanotubes depends on a wide variety of conditions, including, for example, the time of deposition. Access to a variety of morphologies, from simple metal atom clusters to entire continuous surfaces, may be achieved through effective contact with the carbon nanotubes.

In yet further embodiments, metallized carbon nanotubes made by the method described herein may be used in a composite. The metallized carbon nanotube can have at least one metallic structure which includes, but is not limited to, a conductive metal atom selected from the group consisting of platinum, gold, silver, nickel, copper, iron, chromium, zinc, lead, and combinations thereof. The composite incorporating the metallized tube may be virtually any desired matrix material including, but not limited to, those selected from the group consisting of epoxies, thermosets, thermoplastics, elastomers, metals, metal matrix composites, ceramics and combinations thereof.

The foregoing has outlined the features of various embodiments in order that the detailed description that follows may be better understood. Additional features and advantages of various embodiments will be described hereinafter which form the subject of the claims of the invention.

BRIEF DESCRIPTION OF DRAWINGS

The foregoing summary as well as the following detailed description of various embodiments will be better understood when read in conjunction with the appended drawings. It should be understood, however, that the invention is not limited to the precise arrangements and instrumentalities shown herein. The components in the drawings are not necessarily to scale, emphasis instead being placed upon clearly illustrating the principles of various embodiments.

The invention may take physical form in certain parts and arrangement of parts. For a more complete understanding of the present invention, and the advantages thereof, reference is now made to the following descriptions taken in conjunction with the accompanying drawings, in which:

FIG. 3 shows an image of a CNT-loaded SMF for comparison with the image of FIG. 1a.

DETAILED DESCRIPTION

Figure 1:
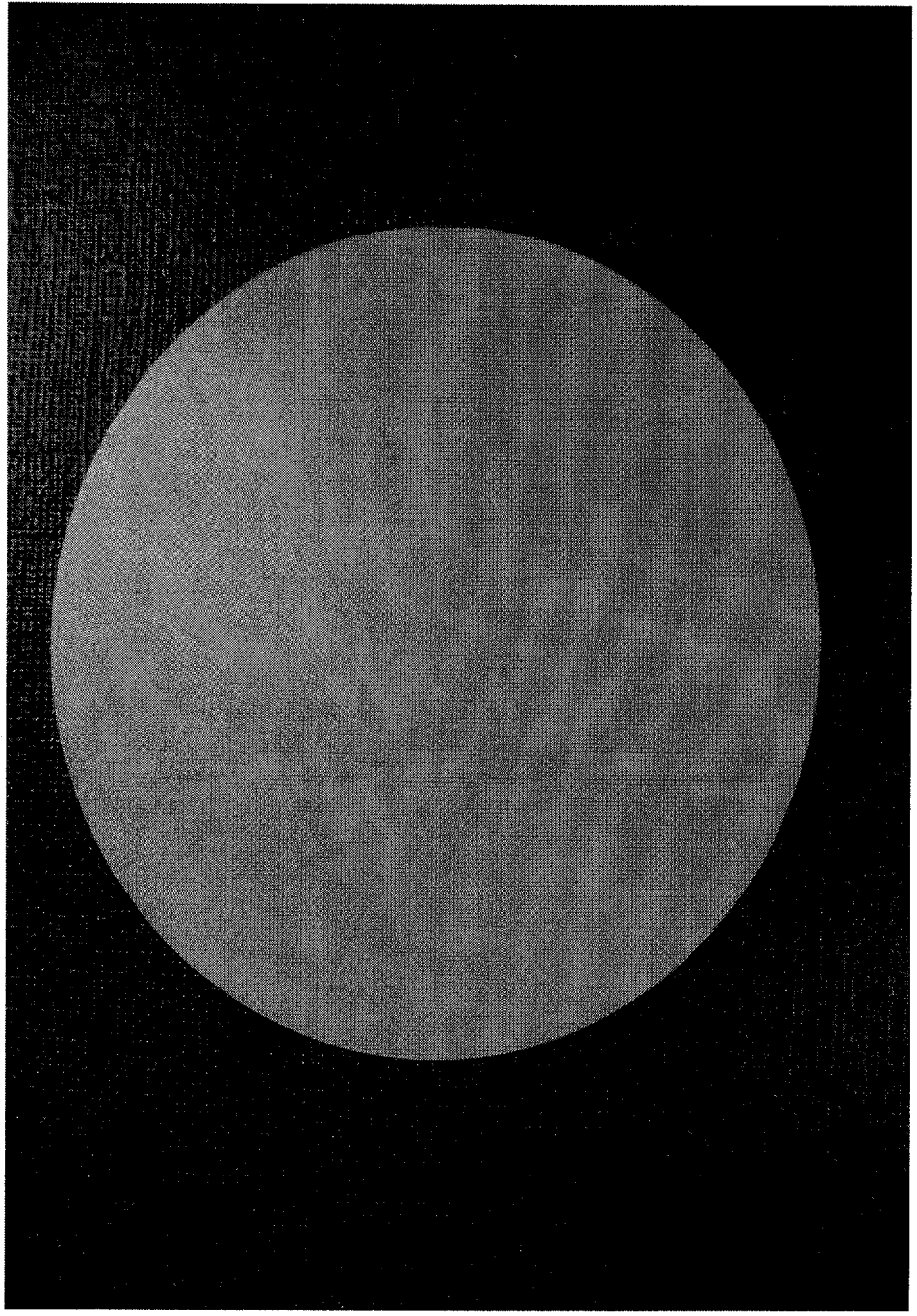
FIG. 1 shows an image of a fresh silver membrane filter (SMF).

The present disclosure generally provides methods for metallizing carbon nanotubes (CNTs). In one aspect, the metallization may include dispersing carbon nanotubes in a solvent and depositing the carbon nanotubes on a porous, conductive substrate. The deposition step may be accomplished by a variety of methods, for example, pressure filtration, vacuum filtration, spraying, film coating, and combinations thereof. The porous, conductive substrate is capable of functioning not only as a filter but also as a working electrode in an electrochemical cell. The substrate-bound carbon nanotubes may provide a convenient storage means for the carbon nanotubes prior to metallization. This may facilitate batch mode processing as well as continuous high throughput/high volume production. Additionally, this may facilitate transport for metallization in other off site laboratories, for example.

Carbon nanotubes, as used herein, can be made by any known technique (e.g., arc method, laser oven, chemical vapor deposition, flames, HiPco, etc.) and can be in a variety of forms, e.g., soot, powder, fibers, "bucky papers," etc. Such carbon nanotubes include, but are not limited to, single-wall carbon nanotubes (SWNTs), multi-wall carbon nanotubes (MWNTs), double-wall carbon nanotubes (DWNTs), buckytubes, fullerene tubes, carbon fibrils, carbon nanotubules, stacked cones, horns, carbon nanofibers, vapor-grown carbon fibers, and combinations thereof. In particular embodiments, such carbon nanotubes are generally selected from single-wall carbon nanotubes, double-wall carbon nanotubes, multi-wall carbon nanotubes, small diameter carbon nanotubes, and combinations thereof. In some embodiments, the carbon nanotubes may be predominantly single-wall carbon nanotubes, while in other embodiments the carbon nanotubes may be predominantly double-wall carbon nanotubes. In yet other embodiments, the carbon nanotubes may be predominantly multi-wall carbon nanotubes. One skilled in the art will recognize that the choice of the number of walls may depend upon the particular application for the metallized nanotube (mCNT).

The carbon nanotubes may comprise a variety of lengths, diameters, chiralities (helicities), number of walls, and they may be either open or capped at their ends. Furthermore, they may be chemically functionalized in a variety of manners. These could include semiconducting (bandgaps ~1-2 eV), semi-metallic (bandgaps ~0.001-0.01 eV) or metallic carbon nanotubes (bandgaps ~0 eV), and more particularly mixtures of the three types.

Chemically functionalized carbon nanotubes, as used herein, comprise the chemical modification of any of the above-described carbon nanotubes. Such modifications can involve the nanotube ends, sidewalls, or both. Chemical modification, according to the present invention, includes, but is not limited to, covalent bonding, ionic bonding, chemisorption, intercalation, surfactant interactions, polymer wrapping, cutting, solvation, and combinations thereof. For some exemplary kinds of chemical modifications, see Liu et al., "Fullerene Pipes," Science, 280, pp. 1253-1256 (1998); Chen et al., "Solution Properties of Single-Walled Carbon nanotubes," Science, 282, pp. 95-98 (1998); Khabashesku et al., "Fluorination of Single-Wall Carbon Nanotubes and Subsequent Derivatization Reactions," Acc. Chem. Res., 35, pp. 1087-1095 (2002); Sun et al., "Functionalized Carbon Nanotubes: Properties and Applications," Acc. Chem. Res., 35, pp. 1096-1104 (2002); Holzinger et al., "Sidewall Functionalization of Carbon Nanotubes," Angew. Chem. Int. Ed., 40(21), pp. 4002-4005 (2001); Bahr et al., "Covalent chemistry of single-wall carbon nanotubes," J. Mater. Chem., 12, pp. 1952-1958 (2002); Gu et al., "Cutting Single-Wall Carbon Nanotubes through Fluorination," Nano Letters, 2(9), pp. 1009-1013 (2002), O'Connell et al., "Reversible water-solubilization of single-walled carbon nanotubes by polymer wrapping," Chem. Phys. Lett., 342, pp. 265-271 (2001), Dyke et al., "Solvent-Free Functionalization of Carbon Nanotubes," J. Am. Chem. Soc., 125, pp. 1156-1157 (2003), Dyke et al., "Unbundled and Highly Functionalized Carbon Nanotubes from Aqueous Reactions," Nano Lett., 3, pp. 1215-1218 (2003).

Carbon nanotubes can also be physically modified by techniques including, but not limited to, physisorption, plasma treatment, radiation treatment, heat treatment, pressure treatment, and combinations thereof, prior to being treated according to the methods of the present invention. In some embodiments of the present invention, carbon nanotubes have been both chemically and physically modified, prior to being treated according to the methods of the present invention.

Any particular carbon nanotube type may be used in purified form or in raw form from the synthetic process. Carbon nanotubes can be in their raw, as-produced form, or they can be purified by a purification technique. Furthermore, mixtures of raw and purified carbon nanotubes may be used. For some exemplary methods of carbon nanotube purification, see Rinzler et al., "Large-Scale Purification of Single-Walled Carbon Nanotubes: Process, Product, and Characterization," Appl. Phys. A, 67, pp. 29-37 (1998); Zimmerman et al., "Gas-Phase Purification of Single-Wall Carbon Nanotubes," Chem. Mater., 12(5), pp. 1361-1366 (2000); Chiang et al., "Purification and Characterization of Single-Wall Carbon nanotubes," J. Phys. Chem. B, 105, pp. 1157-1161 (2001); Chiang et al., "Purification and Characterization of Single-Wall Carbon Nanotubes (SWNTs) Obtained from the Gas-Phase Decomposition of CO (HiPco Process)," J. Phys. Chem. B, 105, pp. 8297-8301 (2001).

In some embodiments, the carbon nanotubes may be separated on the basis of a property such as length, diameter, chirality, electrical conductivity, number of walls, and combinations thereof, prior to being treated according to the methods described herein. See Farkas et al., "Length sorting cut single wall carbon nanotubes by high performance liquid chromatography," Chem. Phys. Lett., 363, pp. 111-116 (2002); Chattopadhyay et al., "A Route for Bulk Separation of Semiconducting from Metallic Single-Wall Carbon nanotubes," J. Am. Chem. Soc., 125, 3370-3375 (2003); Bachilo et al., "Structure-Assigned Optical Spectra of Single-Walled Carbon Nanotubes," Science, 298, 2361-2366 (2002); Strano et al., "Electronic Structure Control of Single Walled Carbon Nanotube Functionalization," Science, 301, pp. 1519-1522 (2003).

In some embodiments the porous, conductive substrate is a membrane filter which includes a conducting material which may be, for example, platinum, gold, carbon, aluminum, stainless steel, and combinations thereof. One skilled in the art will recognize the utility of other conducting materials and that such a choice may be made by consideration of the metal being deposited on the carbon nanotube. In a particular embodiment, the porous, conductive substrate may be a membrane filter made of silver. The membrane filter may have an average pore size ranging from about 0.01 to about 100 microns. The filter pore size may be chosen to facilitate the retention of CNTs, to facilitate removal of the CNTs following metallization, or other processing parameters.

In accordance with embodiments for the metallization of carbon nanotubes, one may engage the porous, conductive substrate with deposited carbon nanotubes in an electrochemical cell and use this construct to deposit at least one metallic structure on the surface of the carbon nanotubes from an electrolyte solution to form metallized carbon nanotubes (mCNTs). The deposition of metallic structures may be accomplished using an electrochemical technique, including without limitation, constant potential, linear sweep voltammetry, cyclic voltammetry, pulse voltammetry, and combinations thereof. These deposition methods can be carried out with varying time intervals, electrical potentials, electrical current, pH, temperature, agitation rate, electrolyte compositions, and pulse settings to influence the amount and the form of deposited metal.

In some embodiments, the electrolyte solution includes a variable concentration of ionic salts of the at least one metallic structure being deposited. In some embodiments, the electrolyte solution includes a variable concentration of non-ionic species of the at least one metallic structure being deposited. Each deposited metallic structure has a morphology that may include discrete particles, aggregations of particles, continuous coatings, discontinuous coatings and combinations thereof. Multiple metals can be deposited with mixed morphologies. One skilled in the art will recognize that for a given metallic structure, one may control morphology of the deposition by varying at least one condition, including, without limitation, the electrical potential, electrical current, temperature, pH, agitation rate, electrolyte compositions, deposition time, pulse settings, and combinations thereof. Additionally, the deposition may be controlled by the physico-chemical properties of the carbon nanotubes themselves.

Once the metallized carbon nanotubes are formed they may be packaged "as is" on the filter for ease of shipping and storage. In other embodiments, one can separate the metallized carbon nanotubes from the porous, conductive substrate by a technique, including but not limited to, the use of reverse flow of solvent through the porous, conductive substrate, sonication in a solvent, vacuum desorption, hydrodynamic desorption, adhesion to an alternate substrate, dissolution of the substrate and combinations thereof. The end product is a metallized carbon nanotube made by the above described methods that can be incorporated into, for example, composite materials for a variety of applications.

Thus, a composite material accessible by the methods described herein above includes metallized carbon nanotubes with metal atom clusters, coatings, or the like. Such metals may include for example platinum, gold, silver, nickel, copper, iron, chromium, cadmium, lead, mercury, zinc, and combinations thereof. Such metallized carbon nanotubes may be incorporated into any appropriate matrix material. Examples of such matrix materials include, for example, epoxies, thermosets, thermoplastics, elastomers, metals, metal matrix composites, ceramics and combinations thereof.

Composite materials incorporating metallized carbon nanotubes may be useful in a variety of settings including, for example, structural materials, coatings, fibers, films and the like. The metallized carbon nanotubes may endow the composite material with antimicrobial properties. For example, copper, silver, and iron have established antimicrobial characteristics. Composite materials incorporating metallized carbon nanotubes may also be useful in electrostatic discharge (ESD), electromagnetic interference (EMI) or RF shielding, or in conductive coatings, adhesives, or sealants. Other useful composite materials may include alloys or solid solutions wherein the metallic structure on the carbon nanotube is a conductive metal atom such as platinum, gold, silver, nickel, copper, iron, chromium, zinc, and combinations thereof. These alloys or solid solutions can be further incorporated into other matrix materials as discussed above.

The metallized carbon nanotubes themselves may be useful as catalysts which possess high specific surface areas and may be highly suited for carrying out chemical reactions. Alternatively, the metallized carbon nanotubes may serve as the chemical precursor for the formation of new or existing chemical species. In an exemplary embodiment, the metallized carbon nanotube can be converted into a metal oxide functionalized carbon nanotube. Such metal oxide functionalized carbon nanotubes may serve as catalysts in a catalytic converter, for example. In addition, subsequent chemical modification to transform the metallized carbon nanotube structure may be used to modify other physical properties.

Finally, the use of the porous, conductive substrates in conjunction with the methods disclosed hereinabove provide an improved means for carrying out "Substrate-Enhanced Electroless Deposition" (S.E.E.D.).

EXAMPLES

The following examples are provided to more fully illustrate some of the embodiments of disclosed hereinabove. It should be appreciated by those of skill in the art that the techniques disclosed in the examples which follow represent techniques that constitute exemplary modes for its practice. However, those of skill in the art should, in light of the present disclosure, appreciate that many changes can be made in the specific embodiments that are disclosed and still obtain a like or similar result without departing from the spirit and scope of the invention.

Materials: The carbon nanotubes (CNTs) used in these examples were purified HiPco SWNTs and XD grade, Lot #XD3365A, from Carbon Nanotechnologies Inc. (Houston, Tex.) with a purity of over 95 wt %. According to the manufacturer, XD grade primarily consists of single-walled CNTs (⅔) and double-walled CNTs (⅓). Silver membrane filter (SMF, 0.2-μm pore size, 47-mm in diameter) was received from Structure Probe (West Chester, Pa.). Epoxy Epikote 862 and curing agent Epikure W were received from Hexion. All other chemicals, including copper nitrate, nickel nitrate, potassium nitrate, sodium dodecyl sulfate (SDS), isopropanol, and acetone, were received from Sigma-Aldrich.

Example 1

Figure 2:
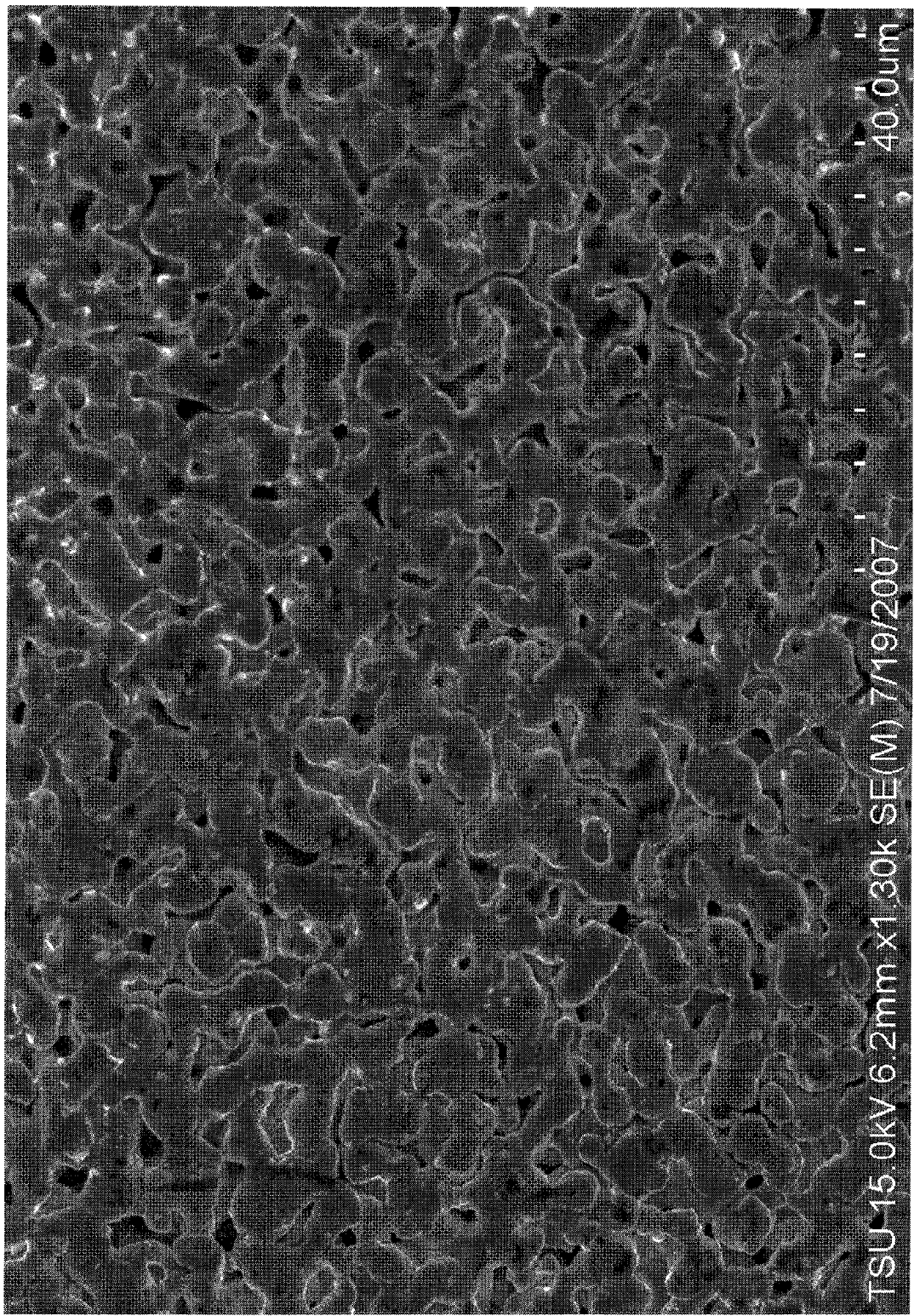
FIG. 2 shows a scanning electron microscope (SEM) image demonstrating the microstructure of a fresh SMF.
Figure 3:
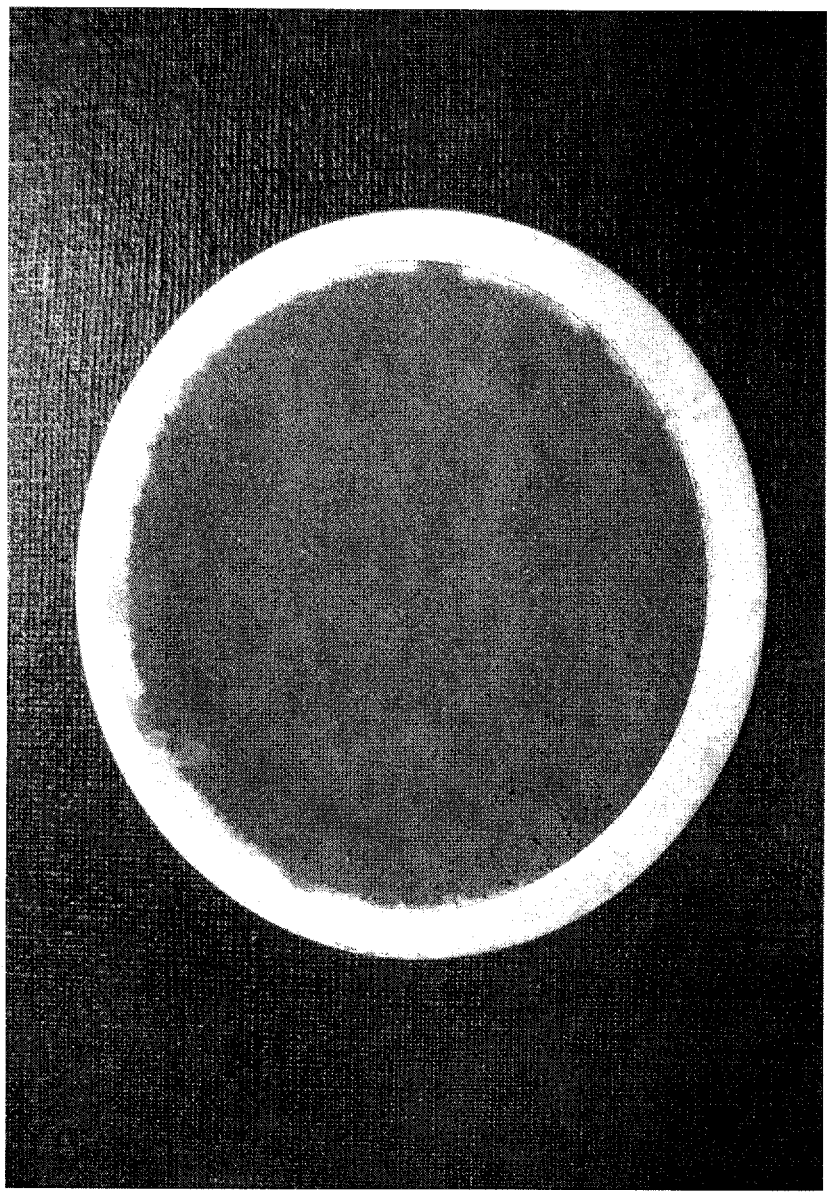

General Preparation of mCNTs: SMF (FIG. 1), which is characteristic of its highly porous yet interconnected microstructure (FIG. 2) and superb electrical conductivity, provides an ideal multi-purpose platform, where CNTs can be anchored through vacuum filtration (FIG. 3). The CNT-loaded SMF serves as a working electrode in a typical 3-electrode setting, where Ag/AgCl electrode is used as a reference electrode and a platinum foil is used as a counter electrode. Linear sweep voltammetry (LSV) is performed at various scan rates to control the extent of electrodeposition. The mCNT products can be retrieved from the SMF after a brief sonication (10-30 seconds), thus regenerating the SMF (FIG. 4) for the next batch of production.

Electron Microscopy: Scanning electron microscopy (SEM) was performed on a Zeiss 1530 VP field-emission SEM system. Since the mCNTs lay on the surface of the conducting SMF, the imaging task was accomplished without surface sputtering. Transmission electron microscopy (TEM) was conducted on a JEOL-1230 TEM system. Sample was prepared using acetone solution casting on a 200-mesh copper grid coated with lacey carbon film.

Surface Analysis: X-ray photoelectron spectroscopy (XPS) was performed on a PHI Quantera X-ray photoelectron spectroscopy system using an Al Kα source at a base pressure of $2.0 \times 10^{-9}$ Pa.

Figure 5:
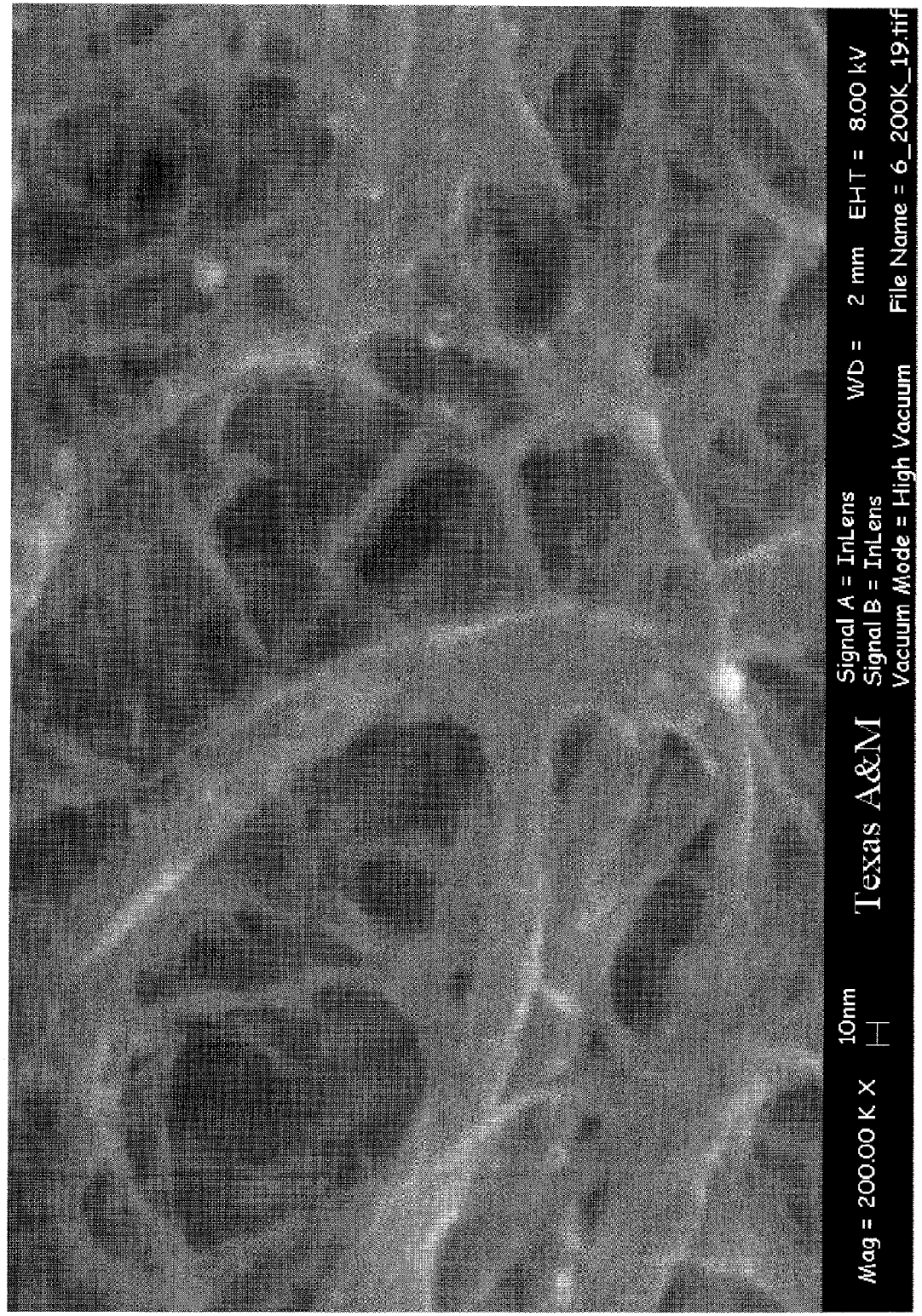
FIG. 5 shows an SEM image of mCNTs from sodium dodecyl sulfate (SDS) dispersion, with 0.11-s electroplating (scale bar=100 nm).

Electron Microscopy: Taking Cu-plating as an example, when the electroplating took place within a short time span (0.11 seconds, scanning from +0.1 to −1.0 V at 10 V/s scan rate), selective metal deposition was observed (FIG. 5), which should be attributed to the higher activities of certain inherent point defects in CNT structure. Since the location and density of such defect sites may affect the chemical and physical properties of CNTs enormously, this technique could be conveniently adopted by the industry as an important analytical protocol to perform fast quality-control surveys in CNT production as well as purification and functionalization processes. FIG. 5 shows an SEM image of mCNTs from SDS dispersion, 0.11-s electroplating (scale bar=100 nm).

Figure 6:
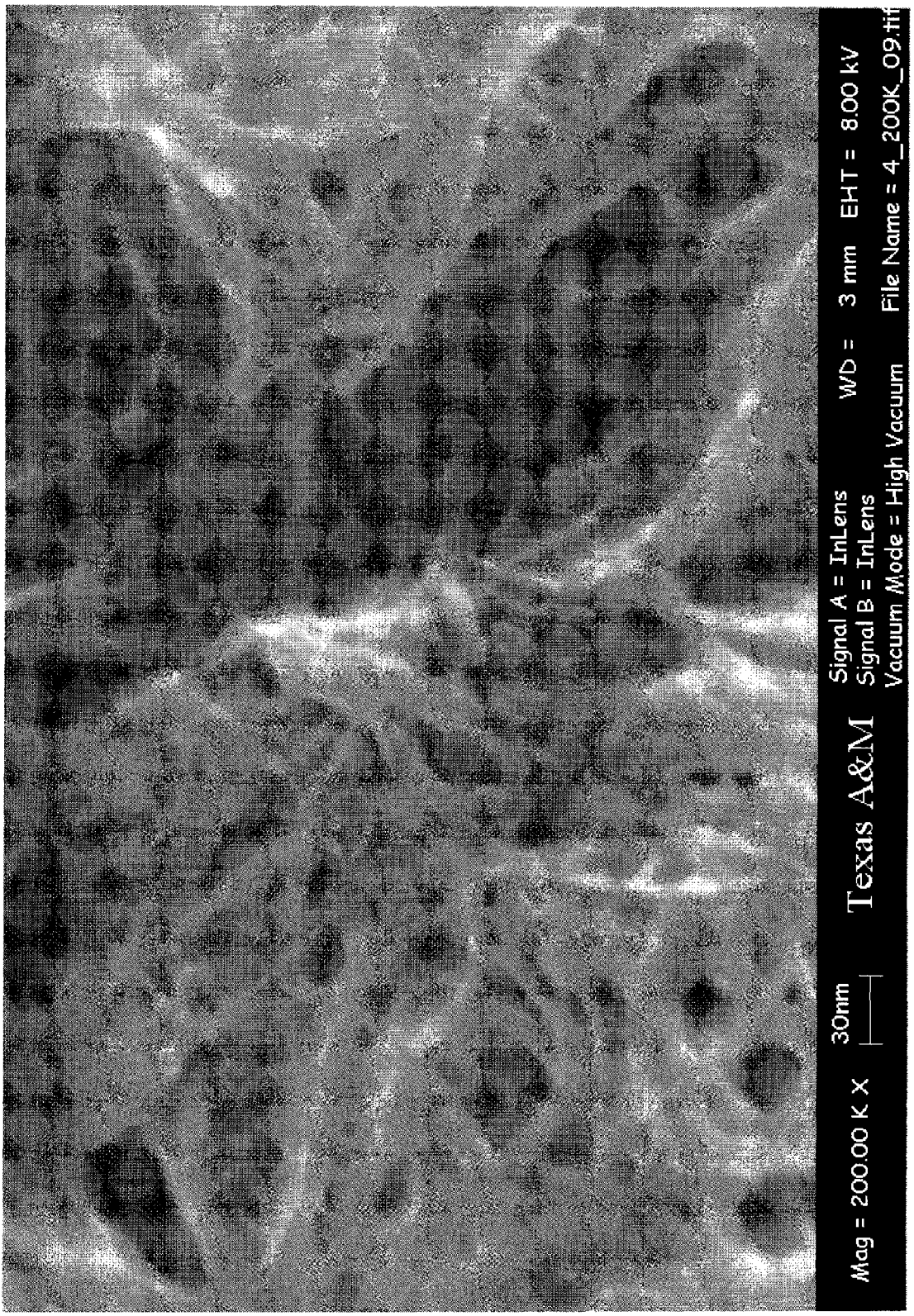
FIG. 6 shows an SEM image of mCNTs from SDS dispersion, with 1.1-s electroplating (scale bar=30 nm).

When the electroplating time was made slightly longer (1.1 seconds, scanning at a rate of 1 v/s), uniformly sized metal atom clusters (about 1-2 nm in diameter) were formed and evenly distributed on the CNT surface (FIG. 6). Taking advantage of the CNT's large specific surface area, good chemical stability, and excellent electronic properties, it is desirable to mount extremely small metal atom clusters as catalysts on CNT support for applications such as highly efficient fuel cells and ultra-sensitive electrochemical (bio) sensors. FIG. 6 shows an SEM image of mCNTs from SDS dispersion, 1.1-s electroplating (scale bar=30 nm).

Figure 7:
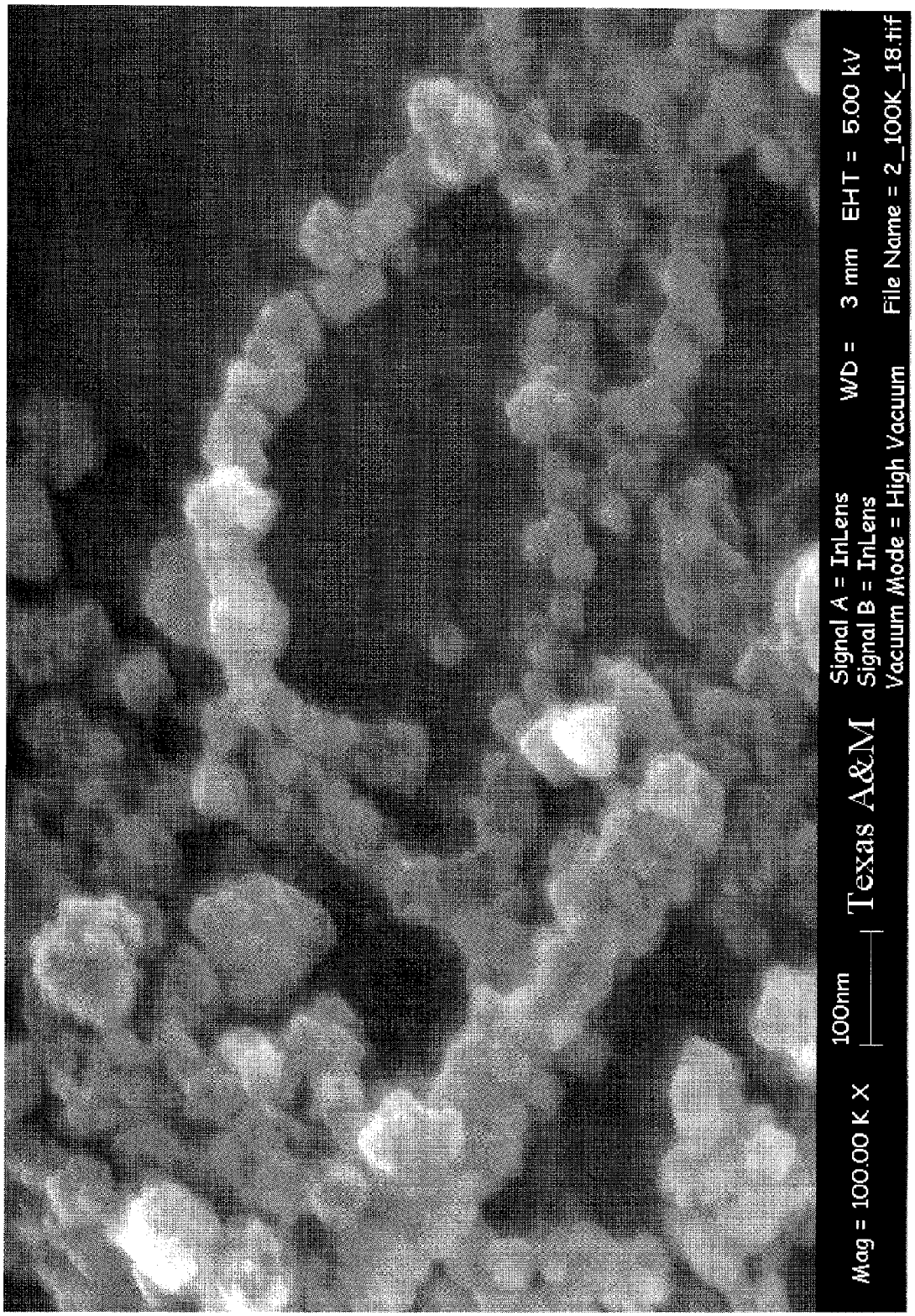
FIG. 7 shows an SEM image of mCNTs from SDS dispersion, with 11-s electroplating (scale bar=100 nm).

When the electroplating time was further extended to 11 seconds (scanning at 100 mV/s), the discrete atom clusters finally evolved into highly packed larger particles (20-30 nm in diameter) that completely encapsulated the CNTs (FIG. 7). FIG. 7 shows an SEM image of mCNTs from SDS dispersion, 11-s electroplating (scale bar=100 nm).

Figure 8:
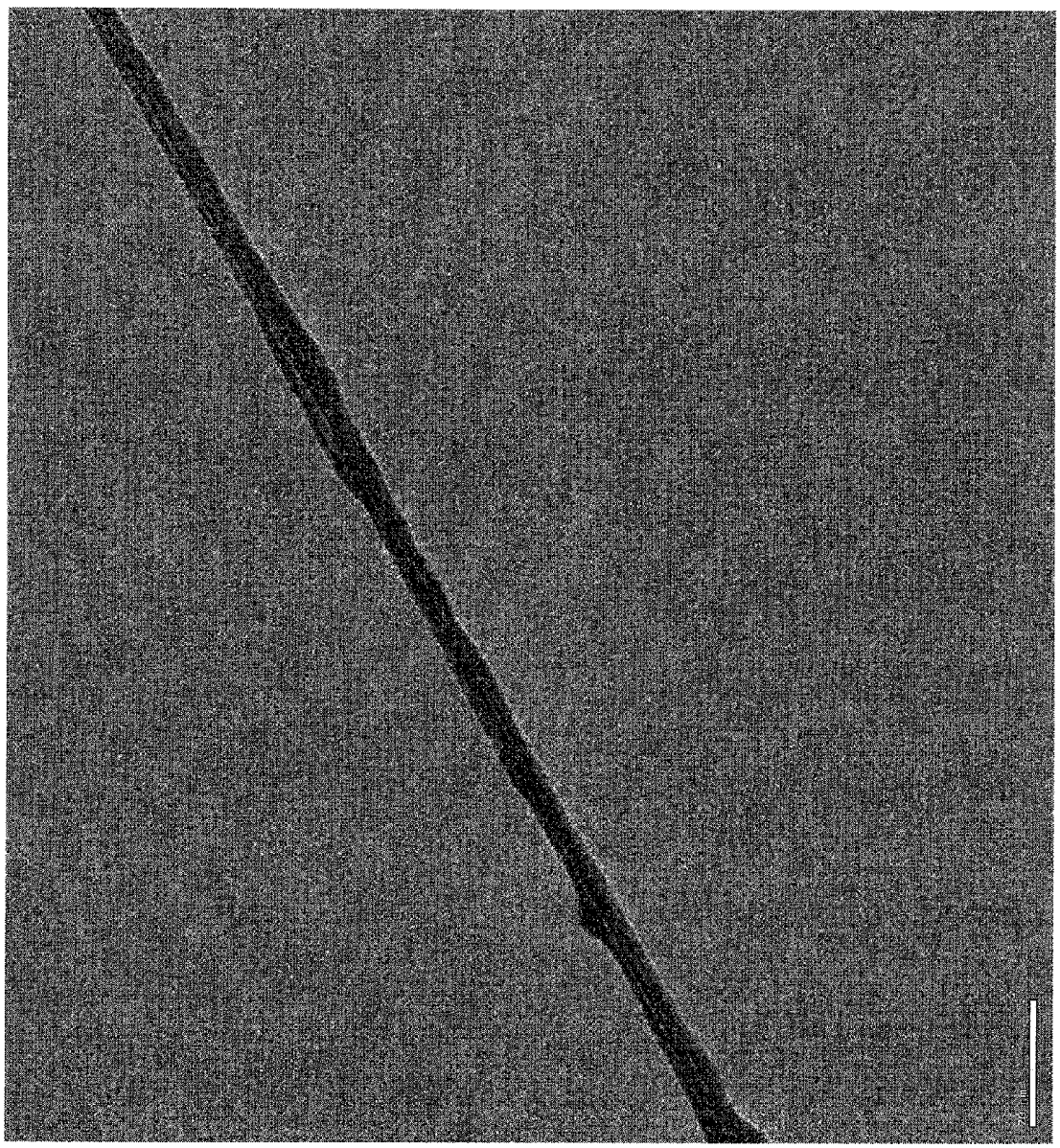
FIG. 8 shows a transmission electron microscope (TEM) image of mCNTs from isopropanol dispersion, with 110-s electroplating (scale bar=20 nm).

Nickel plating can be similarly achieved using the same platform. It should be noted that, efficiency in the electrodeposition could vary appreciably according to the solvent from which the dispersed CNTs were filter-anchored onto the SMF. The prompt electrodepositions as exhibited in FIGS. 5-7 were achieved when CNTs were dispersed in sodium dodecyl sulfate (SDS) surfactant solution. However, when isopropanol was used instead, the electrodeposition was slowed down notably, also resulting in a quite different coating morphology (FIG. 8), i.e. a continuous thin metal coating after 110 seconds of electroplating. FIG. 8 shows a TEM image of mCNTs from isopropanol dispersion, 110-s electroplating (scale bar=20 nm).

Figure 9:
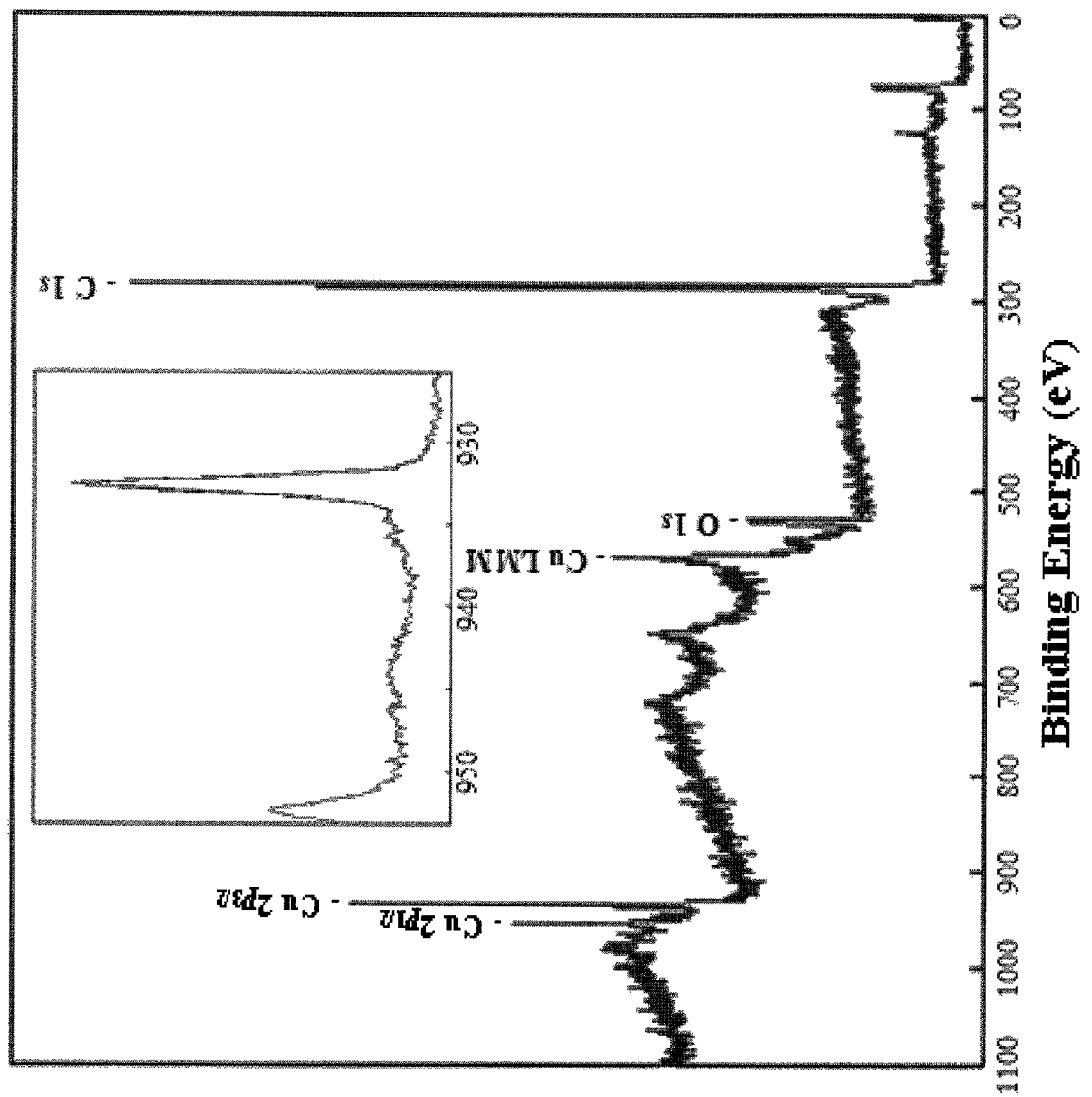
FIG. 9 shows an X-ray photoelectron spectrum (XPS) of mCNTs (inset: Cu 2p spectrum).

Surface Properties: Detailed chemical composition was revealed by XPS. As shown in FIG. 9, an XPS survey spectrum that detected elements Cu and C with a small amount of O. The inset is the Cu 2p spectrum, where a doublet was presented at 932.5 and 952.4 eV, corresponding to Cu 2p3/2 and Cu 2p1/2, respectively 28. The Cu 2p3/2 at 932.5 eV, along with the Cu LMM Auger peak at 568.3 eV indicated that the element Cu existed mainly in the metal form Cu (0)28. The shoulder in the asymmetric Cu 2p3/2 peak, combined with the weak satellite peak at approximately 943 eV was characteristic of Cu (II)28, which suggested that a small amount of Cu2+ also be present probably in the oxide form. FIG. 9 shows an XPS spectrum of mCNTs (inset: Cu 2p spectrum).

Figure 4:
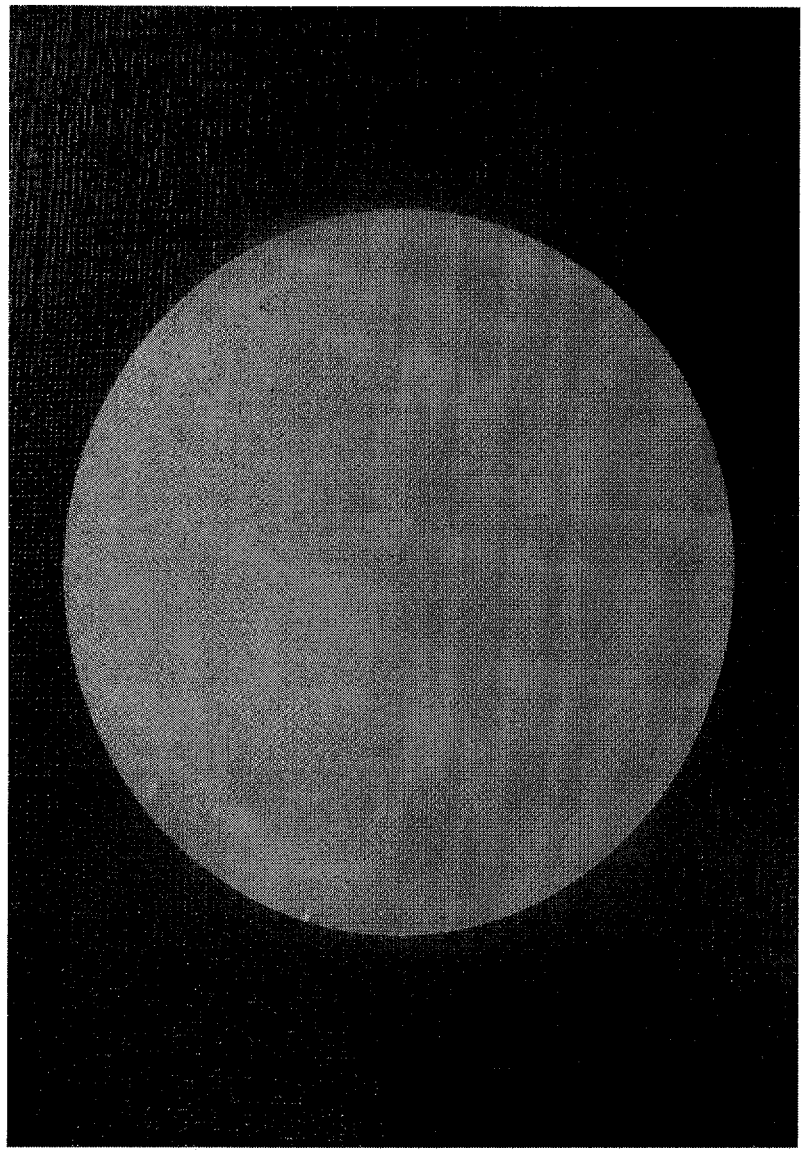
FIG. 4 shows an image of a recycled SMF for comparison with FIGS. 1 and 3.

This example demonstrates that silver membrane filters (SMF) are a particularly ideal platform, where CNTs can be deposited on its surface through a simple vacuum filtration. Taking advantage of silver's superior electrical conductivity, the CNT-loaded SMF may serve as a working electrode, where metal nanostructures can be readily electrodeposited. The metallized CNTs can then be easily removed by a simple back wash or sonication, and the SMF can be recycled (FIG. 4).

Taking copper-plating as a study model, the electroplating is conducted in a typical 3-electrode setting using Ag/AgCl as the reference, containing 0.1 M KNO3 and 0.05 M CuNO3. Linear sweep voltammetry (LSV) is performed from +0.1 V to −1.0 V at various scan rates, which result in prompt metal depositions. Metal nanoparticles (average diameter from a few to 100 nm) can be deposited on single-walled CNT (SWCNT) (FIGS. 5, 6, and 7), while continuous metal coatings can also be formed on double-walled CNT (DWCNT) (FIG. 8). The deposited nano copper metal can be detected by means of XPS and differential pulse voltammetry. When 0.01 wt % of copper-coated CNT is incorporated in an epoxy matrix, the Tg of the composite is significantly higher than those of the neat epoxy and the control with the pristine CNT, which should be attributed to the modified CNT surface and the enhanced dispersion and wetting. Most recently this has been extended to nickel plating.

Example 2

This example demonstrates that SMF is a versatile platform, where nickel (Ni) metal particles may be deposited on the surface of the CNTs, which in a process analogous to the copper-plating process of Example 1.

The electroplating is conducted in a same 3-electrode setting using Ag/AgCl as the reference, containing 0.1 M KNO3, 0.05 M NiNO3, and saturated boric acid. Linear sweep voltammetry is performed from +0.1 V to −1.0 V at a fixed scan rate of 100 mV/s first, followed by a bulk electrolysis with a constant electrical potential held at −1.0 V for a certain time period, varying from 60 to 120 seconds. Nickel metal particles can be deposited on the SWNT (FIGS. 12, 13, 14, and 15). The longer the electroplating time, the more nickel metal deposition found on the surface of CNTs.

Figure 16:
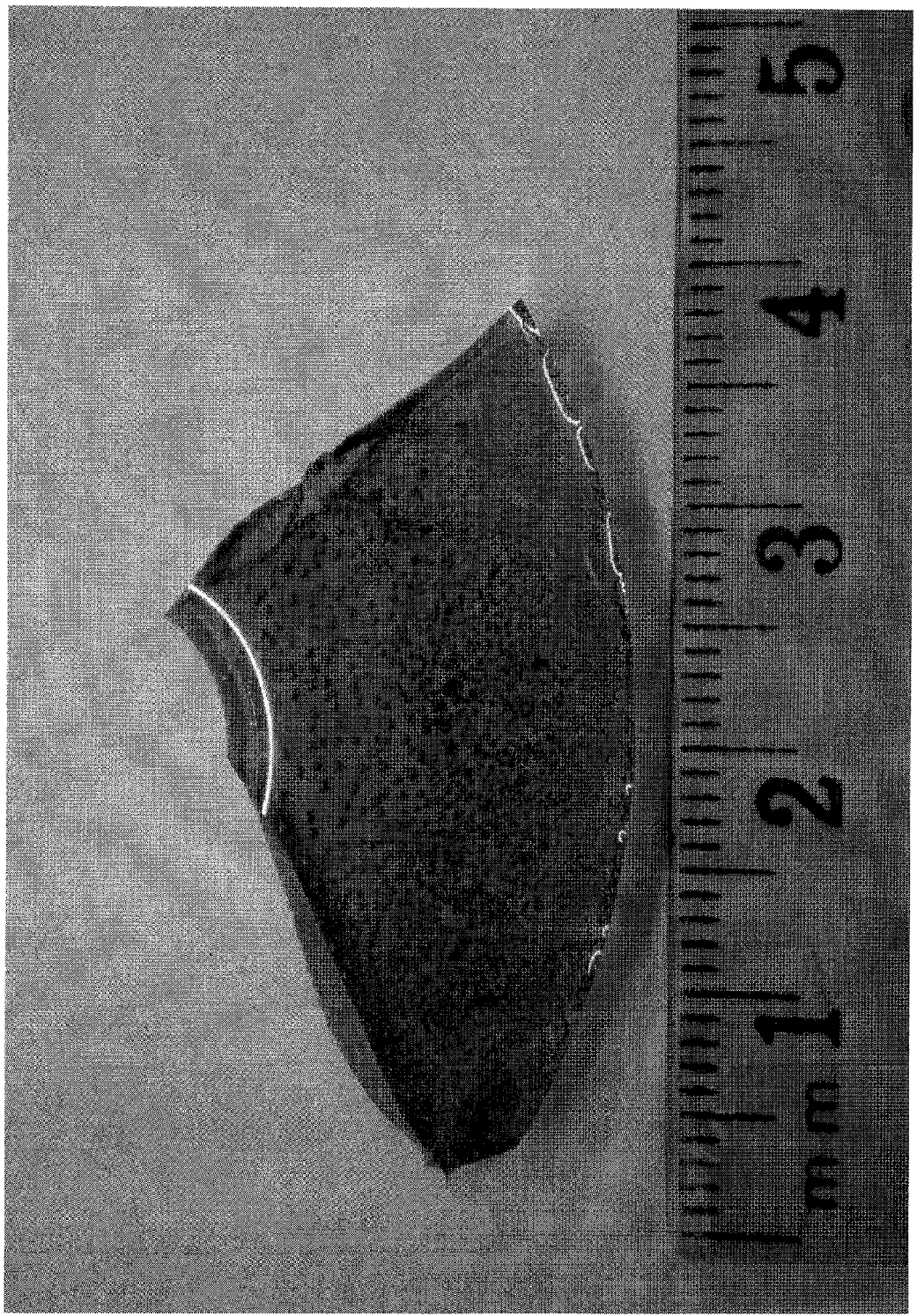
FIG. 16 shows an epoxy composite with 0.1 wt % Ni-coated SWNT.
Figure 17:
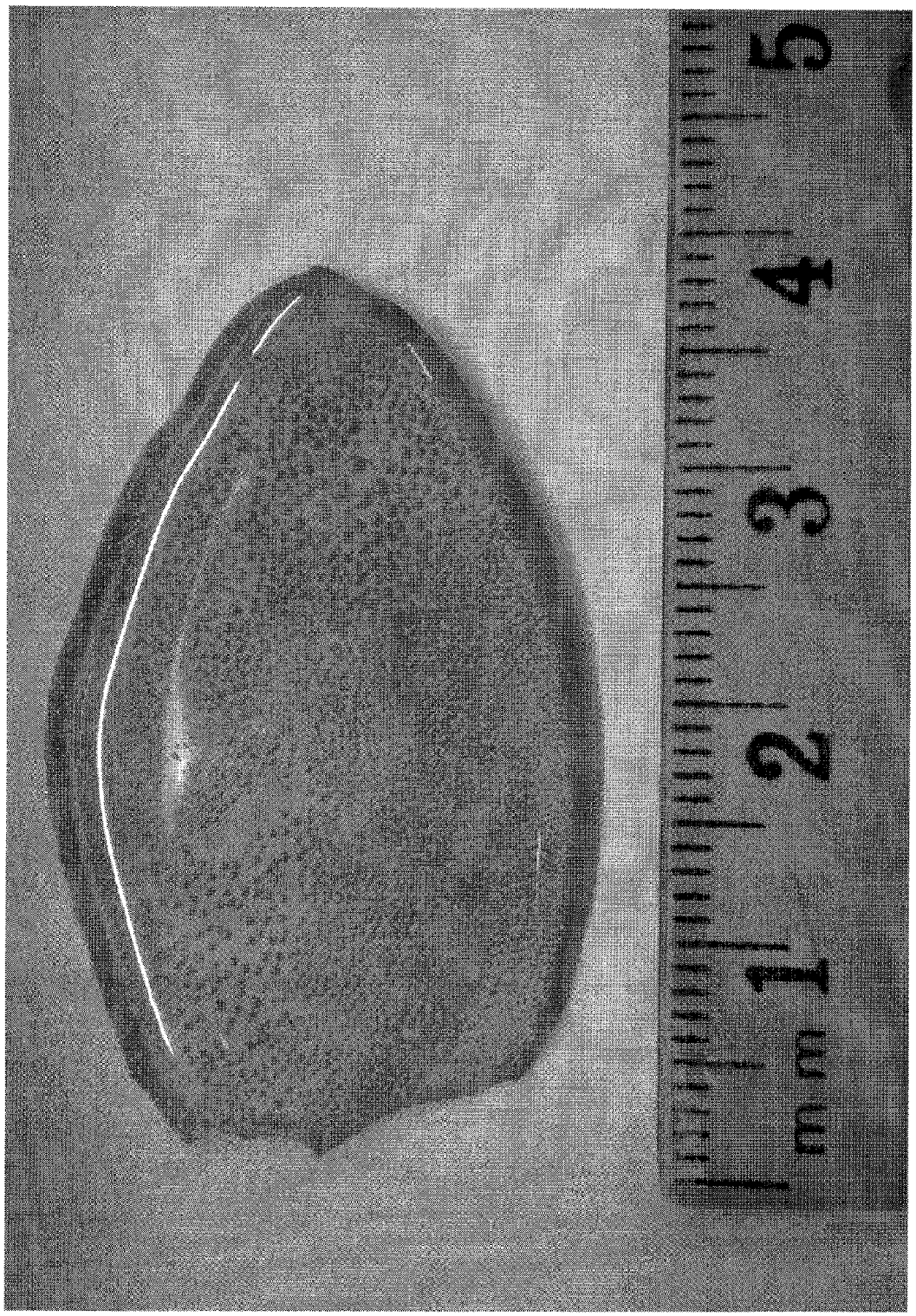
FIG. 17 shows the neat epoxy resin with no SWNT.
Figure 18:
FIG. 18 shows an epoxy composite with 0.1 wt % unmetallized SWNT.

When the Ni-coated CNT that is electroplated for 60 seconds (as shown above in FIG. 12) is incorporated in the epoxy matrix at a concentration of 0.1 wt %, the cured epoxy composite appears to be almost transparent (FIG. 16), which is quite comparable to the neat epoxy resin (FIG. 17). However, the epoxy composite filled with 0.1 wt % un-metallized CNTs is not transparent and appears to contain a lot of agglomerates (FIG. 18). The significant improvement in the sample's transparency indicates that the Ni-coated CNTs can be much better dispersed in the epoxy matrix.

In addition to the electrochemical depositions, theoretically this platform may also be utilized to improve the current Substrate-Enhanced Electroless Deposition technique for certain noble metal depositions.

The demonstrated technique presents a major advance in manufacturing the important metal/CNT hybrid materials. The new platform enables scalable fabrication of such materials in industry and offers great opportunities for the related fundamental research as well as the further exploration of potential applications in a broader range. The central goal is to ultimately benefit from the unique properties of the new nanocomposites.

(1) A typical electrodeposition process runs as follows: First, 1~5 mg CNT is dispersed in a solvent (such as isopropanol, acetone, DMF, DMA, etc.) or sodium dodecyl sulfate aqueous solution in an ultrasound bath. Then the solution is filtered through the SMF a standard 47-mm silver membrane filter (SMF, porosity: 0.2 μm) by vacuum filtration. CNTs are therefore retained on the surface of the porous SMF. The CNT-loaded SMF is directly used as the working electrode in a typical 3-electrode setting. The electroplating solution contains 0.10 M $KNO_3$ supporting electrolyte and 0.050 M $CuNO_3$. Linear Sweep Voltammetry (LSV) technique is conducted on CHI760B (CH Instruments) electrochemical workstation between +0.1 and −1.0 V at different scan rates (10 V/s, 1 V/s, 100 mV/s, 10 mV/s). Alternatively, bulk electrolysis (constant potential) technique may also be applied. After the electrodeposition, deionized water is filtered through the SMF to remove the remaining organic solvents, electrolytes and surfactant molecules. Finally, the metal-decorated CNTs are collected by sonicating the SMF in acetone, then removing the solvent. The refreshed SMF is immediately available for the next batch production. The SMF is available in larger sizes, therefore metalized CNTs may be produced in larger batch sizes.

(2) When sodium dodecyl sulfate surfactant is applied in the first step of dispersion, significantly accelerated metal deposition is observed. In addition, since individual CNTs are stabilized on SMF by the surfactant molecules adsorbed on the CNT surface, better metal nanoparticle distribution and less CNT agglomeration have been observed after the metal deposition. For example, with the aid of the surfactant, metallized SWCNTs produced by LSV at a scan rate of 1 V/s, which means a total electroplating time of merely 1.1 seconds, results in evenly distributed copper atom clusters with an average diameter of only a few nanometers, as shown in FIG. 6. FIG. 7 shows heavily metallized SWCNTs also produced by LSV at a slower scan rate of 100 mV/s, which translates into a total electroplating time of 11 seconds. Thanks to the manageability of the electrochemical technique, these deposition results are highly reproducible. SEM pictures were taken using a Zeiss 1530 VP FE-SEM system.

(3) FIG. 8 shows a similarly metallized DWCNT also produced by LSV at the scan rate of 10 mV/s, however, without the aid of the surfactant in the first step of CNT dispersion. The TEM picture was taken using a JEOL JEM-1230 TEM system.

(4) XPS spectra were recorded on a PHI Quantera X-ray photoelectron spectroscopy using an Al Kα source at a base pressure of $2.0 \times 10^{-9}$ Pa. The XPS survey spectrum for a Cu-coated DWCNT is presented in FIG. 9. In the spectrum, only Cu and C elements with a trace amount of O element are detectable on the DWCNT surface.

Narrow XPS scan of Cu 2p within the binding energy (BE) range of 928-968 eV is also shown in the FIG. 9 inset. The Cu 2p spectrum presents a doublet corresponding to Cu 2P1/2 and Cu 2P3/2 with a BE difference of 19.9 eV. The spectrum can be fitted with three two spin-orbit-split doubles. The main doubled with the Cu2P3/2 peaks lying at 932.2, 932.9 and 933.8 eV with a FWHM of 1.2 eV are attributed to Cu (0), Cu2O and CuO, respectively. The relative areas of these fitted peaks allow us to determine the percentages of Cu (0), Cu2O and CuO as 68.0, 32.0 and 0.068 atom %, respectively.

Figure 10:
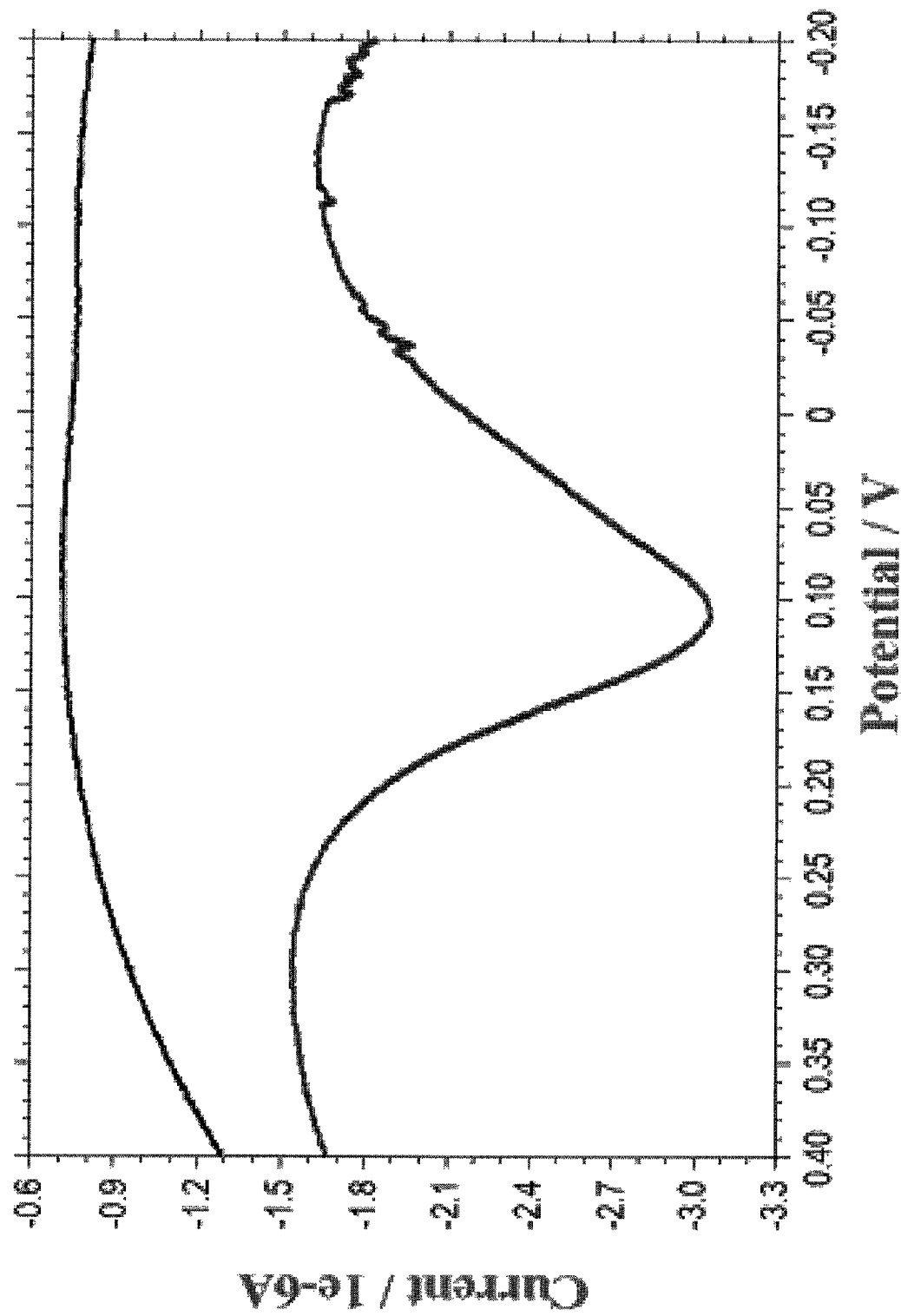
FIG. 10 shows differential pulse voltammograms collected from a bare glassy carbon electrode (blue) and a glassy carbon electrode loaded with Cu-coated CNTs (red).

(5) Differential pulse voltammograms were collected from the same CHI760B workstation using a bare glassy carbon electrode and a glassy carbon electrode that was loaded with Cu-coated DWNTs. FIG. 10 shows differential pulse voltammograms collected from a bare glassy carbon electrode (blue) and a glassy carbon electrode loaded with Cu-coated DWNTs (red). FIG. 10 indicates a very strong copper oxidation peak from the glassy carbon electrode loaded with Cu-coated DWNTs. This result along with the XPS data confirms that copper metal has been successfully deposited on the CNTs.

(6) Differential scanning calorimetry (DSC) measurements of a neat epoxy resin and epoxy composites filled with copper-coated DWNTs were recorded by Q1000 (TA Instruments) using the temperature ramp technique at 20° C./min. Epoxy Epikote resin 862 and Epikure curing agent W were used as a model polymer matrix. About 1 g of 862, 0.264 g of W, and CNTs (0.001 to 0.01 wt %) were mixed with a mortar and pestle for 30 min to achieve visual homogeneity. The mixture was then cured at 177° C. for 2.5 hr in an air oven. The epoxy filled with 0.01 wt % copper-coated DWNTs exhibits a significantly higher Tg (129.7° C.) than the neat epoxy (123.3° C.). The higher Tg in the epoxy composite filled with 0.01 wt % Cu-coated DWNT is believed to be due to the metalized CNT's higher surface polarity, resulting in better wetting and dispersion in the polar epoxy matrix.

Figure 11:
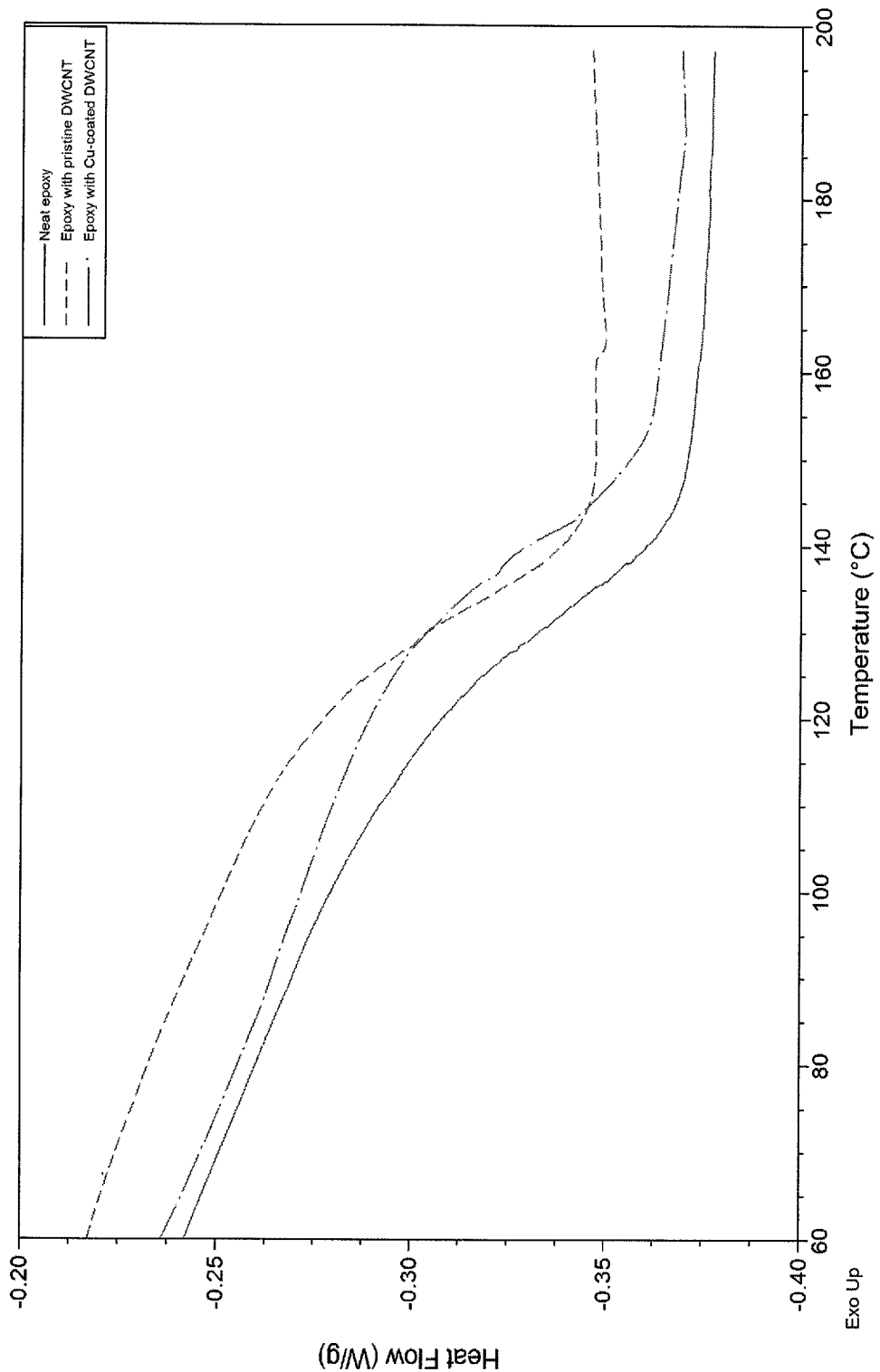
FIG. 11 shows DSC thermograms of epoxy resin and composites with metallized carbon nanotubes.
Figure 12:
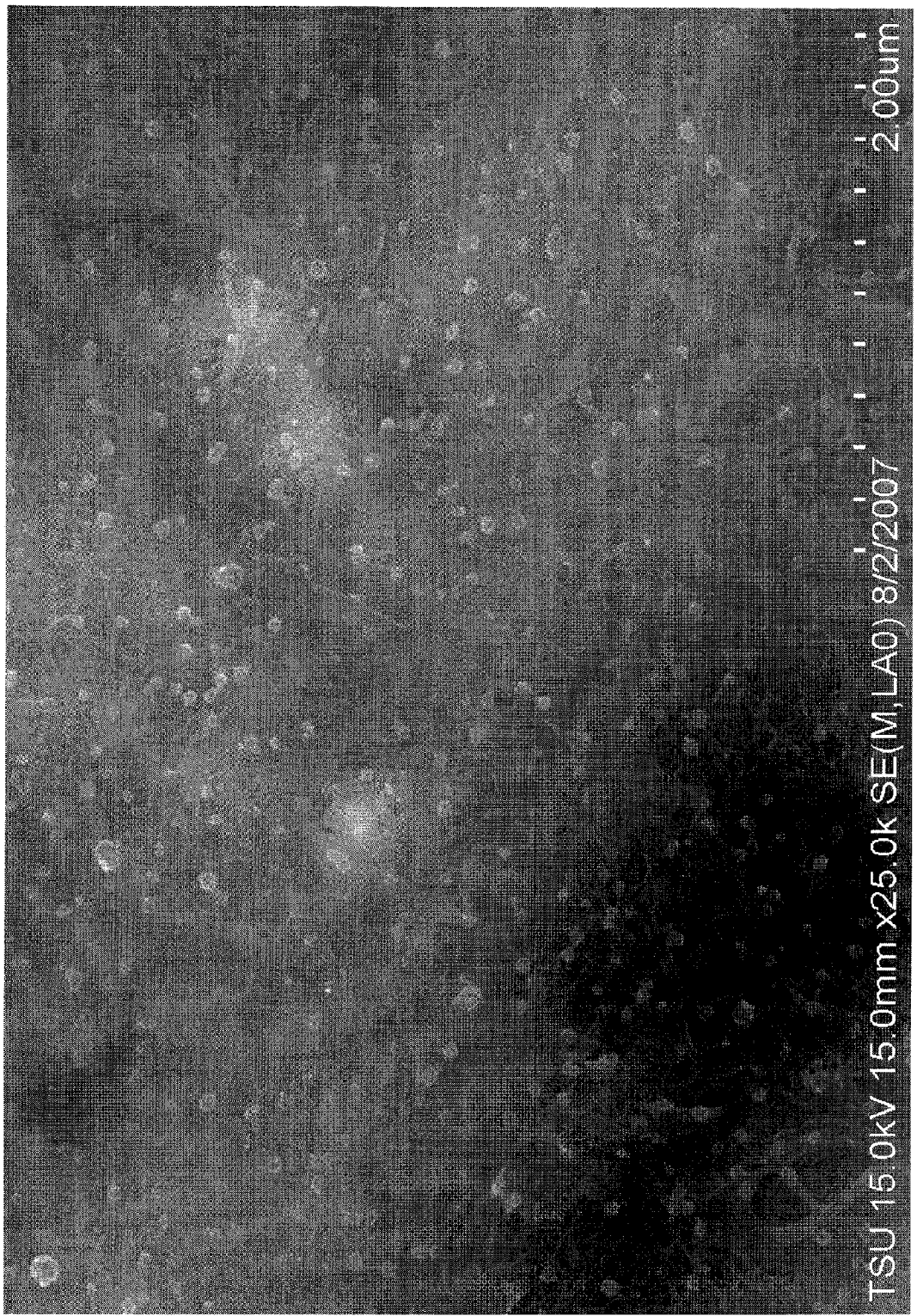
FIG. 12 shows an SEM image of SWNTs Ni-plated for 60 seconds.
Figure 13:
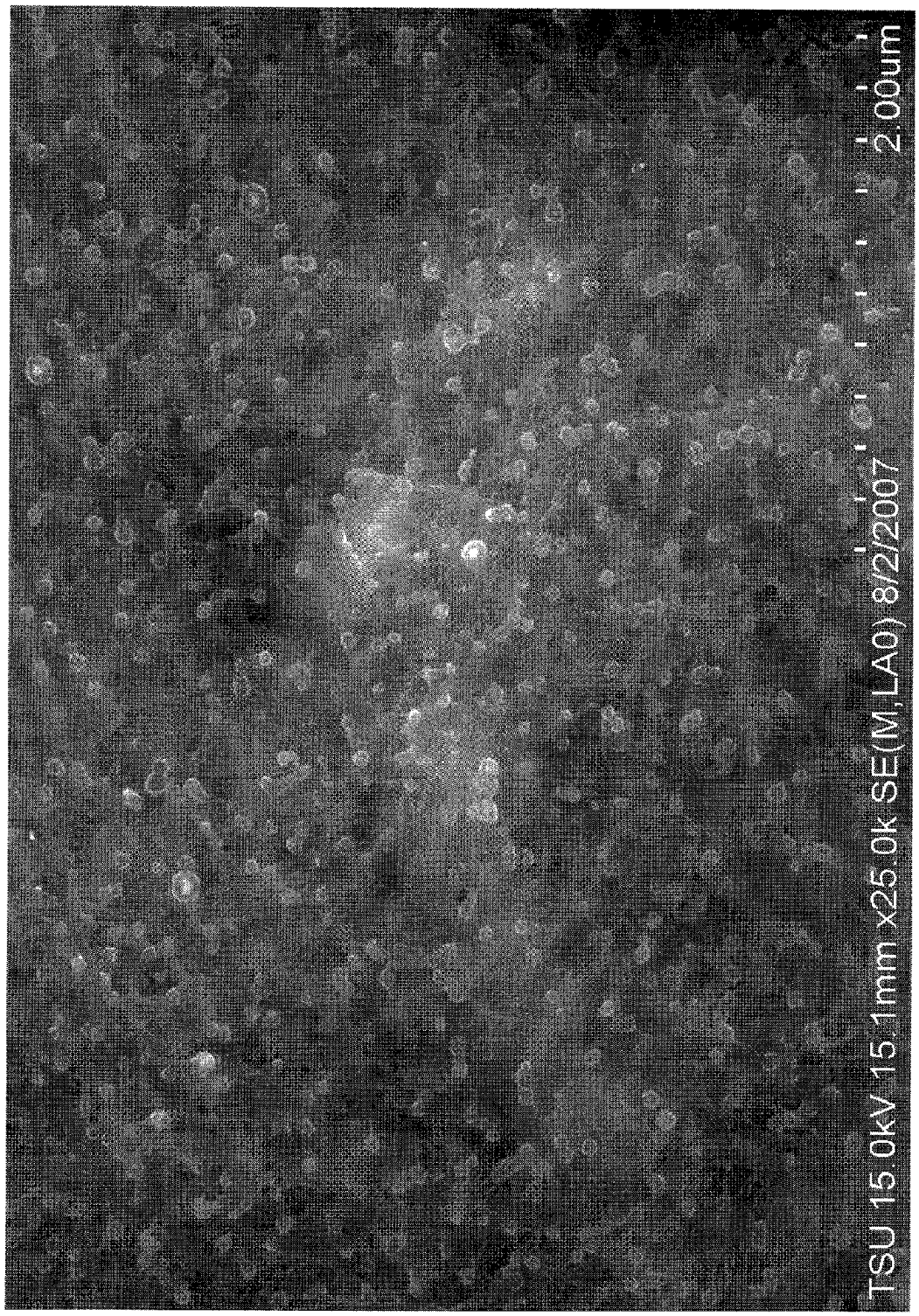
FIG. 13 shows an SEM image of SWNTs Ni-plated for 80 seconds.
Figure 14:
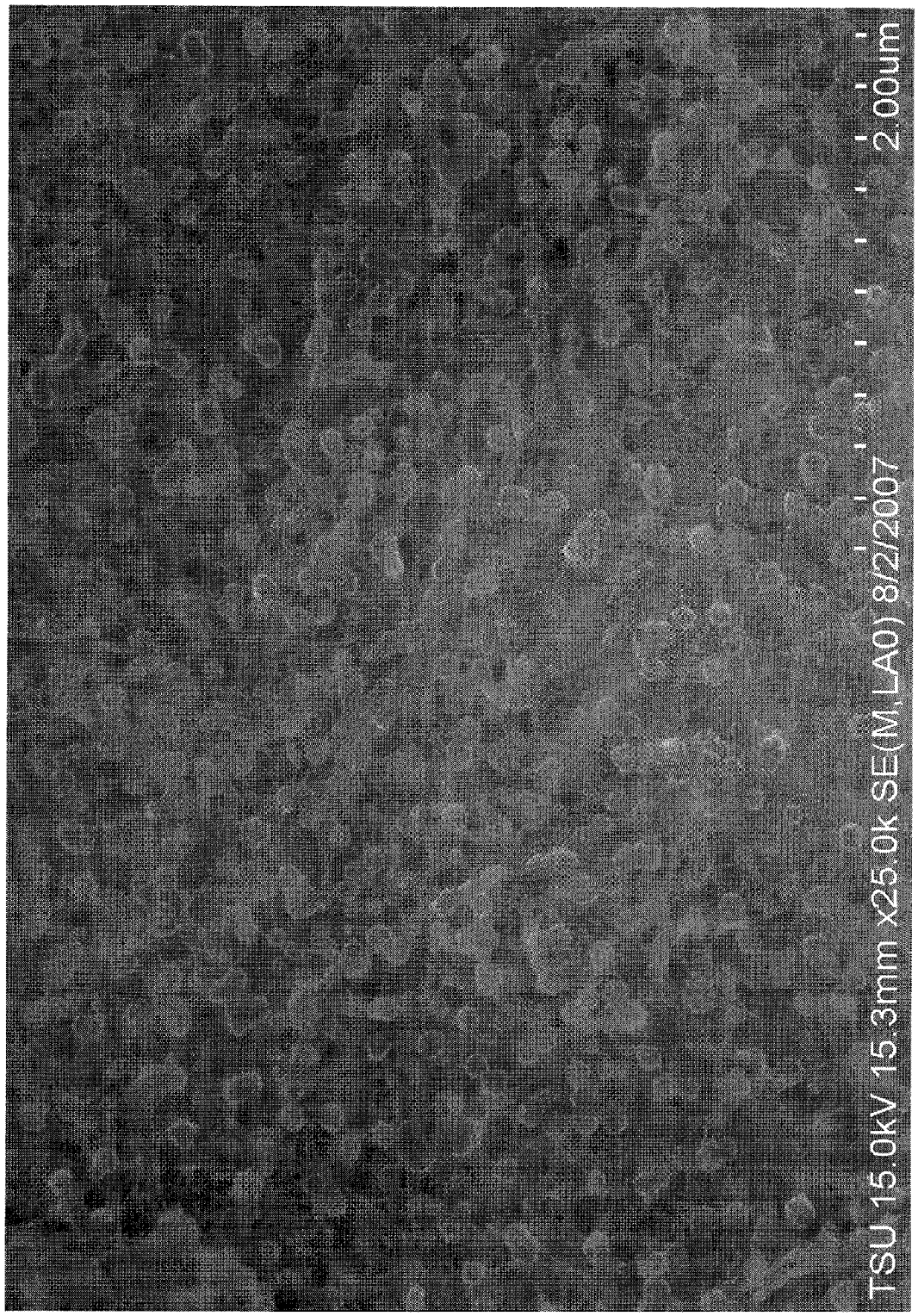
FIG. 14 shows an SEM image of SWNTs Ni-plated for 100 seconds.
Figure 15:
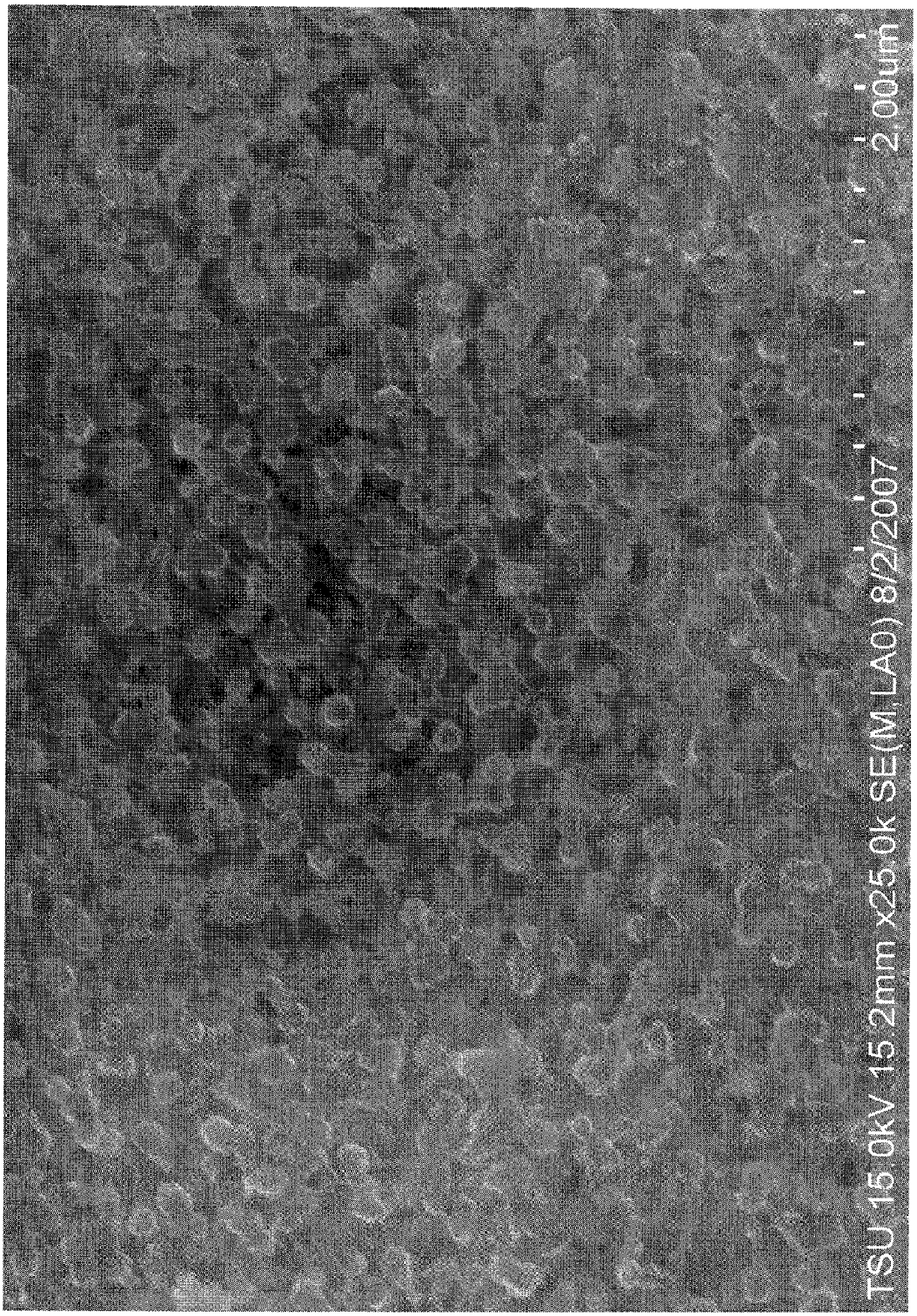
FIG. 15 shows an SEM image of SWNTs Ni-plated for 120 seconds.

FIG. 11 shows DSC thermograms of epoxy resin and composites with metallized carbon nanotubes. According to the thermograms, the epoxy filled with the copper-coated DWCNT exhibits a significantly higher Tg (141.27° C.) than the neat epoxy (134.74° C.), while the Tg of the control composite containing the pristine DWCNT is slightly lower (132.57° C.), which is mainly due to the CNT's physical hindrance on the reactive epoxy and amine groups and consistent with our recent discovery. The extraordinarily high Tg in the epoxy composite filled with the Cu-coated DWCNT should be attributed to the improved CNT surface with higher surface polarity that results in better wetting and dispersion in the polar epoxy matrix.

Metallized carbon nanotubes (mCNTs) represent a next-generation nanomaterial for many advanced applications, such as fuel cells, sensors, nanoreinforced composites, electromagnetic interference shielding, and 3D nanostructure fabrications. The scaleable production technique for the metallization of CNTs is expected to lead to significant commercial developments. Among existing techniques, physisorption involves separate preparation of metal nanoparticles as well as a time-consuming sonication for dispersion and attachment; while electroless deposition usually requires a lengthy CNT pretreatment consisting of harsh acid oxidation and activation-sensitization procedures. Electrochemical deposition would be preferable due to its manageability and reproducibility, yet it has been until now exceptionally challenging to make reliable electrical contact with a quantity of CNTs. Previous efforts included in-situ CNT growth on a conducting substrate, microlithography, electrophoresis, and sputtering. Advantageously, the methods described herein demonstrate that, CNTs anchored on a porous conductive substrate can be electroplated, resulting in exquisite metal nanostructures, varying from discrete atom clusters to uniform coatings, on CNT surfaces.

Although specific embodiments have been disclosed herein in some detail, this has been done solely for the purposes of describing various features and aspects of embodiments, and is not intended to be limiting with respect to the scope of these embodiments. It is contemplated that various substitutions, alterations, and/or modifications, including but not limited to those implementation variations which may have been suggested herein, may be made to the disclosed embodiments without departing from the spirit and scope of the embodiments as defined by the appended claims which follow.

What is claimed is:

1. A method comprising:
dispersing carbon nanotubes in a solvent;
depositing the carbon nanotubes on a first portion of a porous, conductive substrate;
wherein the porous, conductive substrate is a silver membrane filter and is capable of functioning as a working electrode;
engaging a second portion of the porous, conductive substrate in an electrochemical cell; and
electrodepositing at least one metallic nanostructure on the surface of the carbon nanotubes from metal ions in an electrolyte solution to form metalized carbon nanotubes,
wherein the electrodepositing comprises controlling the morphology of the at least one metallic nanostructure, and
wherein the morphology is selected from the group consisting of discrete particles, aggregations of particles, continuous coatings, discontinuous coatings, and combinations thereof.

2. The method of claim 1, wherein the step of depositing the carbon nanotubes is accomplished by a method selected from the group consisting of pressure filtration, vacuum filtration, spraying, film coating, and combinations thereof.

3. The method of claim 1, wherein the carbon nanotubes are selected from the group consisting of single-wall carbon nanotubes, double-wall carbon nanotubes, multi-wall carbon nanotubes, nanofibers, and combinations thereof.

4. The method of claim 3, wherein the carbon nanotubes comprise single-wall carbon nanotubes.

5. The method of claim 3, wherein the carbon nanotubes comprise double-wall carbon nanotubes.

6. The method of claim 3, wherein the carbon nanotubes comprise multi-wall carbon nanotubes.

7. The method of claim 1, wherein the carbon nanotubes are further functionalized.

8. The method of claim 1, wherein the porous, conductive substrate is a membrane filter comprising a conducting material selected from the group consisting of platinum, gold, copper, and combinations thereof.

9. The method of claim 1, wherein the porous, conductive substrate comprises silver.

10. The method of claim 1, wherein the step of electrodepositing metallic nanostructures comprises an electrochemical technique selected from the group consisting of constant potential, linear sweep voltammetry, cyclic voltammetry, pulse voltammetry, and combinations thereof.

11. The method of claim 1, wherein the at least one electrodeposited metallic nanostructure has a morphology selected from the group consisting of discrete particles, aggregations of particles, continuous coatings, discontinuous coatings and combinations thereof.

12. The method of claim 1, wherein the step of electrodepositing the at least one metallic nanostructure is controlled by varying at least one condition selected from the group consisting of electrical potential, electrical current, temperature, pH, agitation rate, electrolyte compositions, deposition time, pulse settings, and combinations thereof.

13. The method of claim 1, wherein the step of electrodepositing the at least one metallic nanostructure is controlled by the physico-chemical properties of the carbon nanotubes.

14. The method of claim 1 further comprising non-disruptively separating the metallized carbon nanotubes from the porous, conductive substrate by a technique selected from the group consisting of reverse flow of solvent through the porous, conductive substrate, sonication in a solvent, vacuum desorption, hydrodynamic desorption, adhesion to an alternate substrate, and combinations thereof.

* * * * *

UNITED STATES PATENT AND TRADEMARK OFFICE
CERTIFICATE OF CORRECTION

PATENT NO. : 8,709,226 B2  Page 1 of 1
APPLICATION NO. : 12/518382
DATED : April 29, 2014
INVENTOR(S) : Wei et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1015 days.

Signed and Sealed this

Twenty-ninth Day of September, 2015

Michelle K. Lee
*Director of the United States Patent and Trademark Office*